United States Patent [19]

Peter et al.

[11] Patent Number: 5,785,281
[45] Date of Patent: Jul. 28, 1998

[54] LEARNING AUTOPILOT

[75] Inventors: Francis E. Peter; Fred M. Strohacker, both of Albuquerque, N. Mex.

[73] Assignee: Honeywell Inc., Minneapolis, Minn.

[21] Appl. No.: 333,162

[22] Filed: Nov. 1, 1994

[51] Int. Cl.$^6$ .................................................. B64C 13/16
[52] U.S. Cl. ........................ 244/190; 244/3.17; 701/223; 364/456; 342/64
[58] Field of Search ................................ 244/189, 190, 244/3.17; 701/223; 364/456, 460, 449; 342/64; 348/112

[56] References Cited

U.S. PATENT DOCUMENTS

| | | | |
|---|---|---|---|
| 3,688,252 | 8/1972 | Thompson | 340/24 |
| 4,514,733 | 4/1985 | Schmiddlein et al. | 343/5 MM |
| 5,043,903 | 8/1991 | Constant | 364/460 |
| 5,067,674 | 11/1991 | Heyche et al. | 244/190 |
| 5,072,396 | 12/1991 | Fitzpatrick et al. | 348/117 |
| 5,170,352 | 12/1992 | Metamonez | 364/449 |
| 5,204,814 | 4/1993 | Noonan et al. | 364/424.02 |
| 5,308,022 | 5/1994 | Cronkite et al. | 244/190 |
| 5,331,561 | 7/1994 | Barett et al. | 364/447 |
| 5,503,390 | 4/1996 | Frote | 244/190 |
| 5,521,817 | 5/1996 | Burdoin et al. | 244/190 |
| 5,544,061 | 8/1996 | Morimoto et al. | 364/449 |
| 5,555,503 | 9/1996 | Kyrtos et al. | 364/449 |

*Primary Examiner*—Galen L. Barefoot
*Attorney, Agent, or Firm*—Andrew A. Abeyta; Kenneth J. Johnson

[57] ABSTRACT

A learning autopilot for a vehicle provides the capability to command complex maneuvers or maneuver the vehicle when control by its ground station is not possible. A memory is used during a piloted rehearsal mission and position and time information for the aircraft is stored in the memory. This memory is incorporated into the vehicle control system, and during automatic operation of the aircraft, the recorded position and relative time information is retrieved and compared against position and relative time information occurring during automatic flight. The difference between the recorded information and the actual flight information is used to generate error signals which are converted to command signals for the vehicle. Maneuvers which were initiated and completed by the pilot during the rehearsal mission are then repeated during the automatic flight from the flight information stored in the memory.

22 Claims, 6 Drawing Sheets

LEARNING AUTOPILOT

BACKGROUND OF THE INVENTION

1. Field of the Invention

The present invention relates to vehicle autopilots and, more particularly, to an autopilot for unmanned vehicles in which portions of a mission are preprogrammed into the vehicle control computer to provide for fully automatic operation of the vehicle.

2. Discussion of the Related Art

The use of drone vehicles is well-known. A drone is a pilotless vehicle operated by remote control. The more well-known types of drones are aircraft used as aerial targets, for reconnaissance, or for ordnance delivery.

The typical drone system consists of an airborne vehicle with a specialized airborne drone control system in combination with a ground station. The airborne drone control system is adapted to provide positive control of the drone throughout the flight envelope of the air vehicle. In addition, appropriate electrical or mechanical devices on board are also controlled through the drone control system. These electrical/mechanical devices are used to actuate such things as the aircraft flight control linkages, landing gear, wing flaps, slats, wheel brakes, speed brakes, nose wheel steering, and any other electrical connections used for controlling the air vehicle. The aircraft is controlled from the ground through the use of a ground station. The ground station transmits radio frequency (RF) command signals to the remotely-piloted aircraft where the on-board drone control system provides commands to the aircraft control equipment. The ground station is adapted to interface with a drone controller or other ground operator, thereby allowing the remotely-piloted vehicle to execute real-time commands.

Three types of drone ground stations are typically used. In the first type (Type 1), the ground station radiates to the drone from a single antenna, and using antenna elevation angle, azimuth angle, and range, is able to determine the point at which the drone is located. For this to work, constant line-of-sight must be maintained between the ground station antenna and the drone. Any time the drone flies out of direct line-of-sight with the antenna, control of the drone is lost. The drone is typically programmed with automatic responses so that when contact is lost with the ground station, the drone will automatically climb and loiter until ground station control is reestablished.

Figure 1:
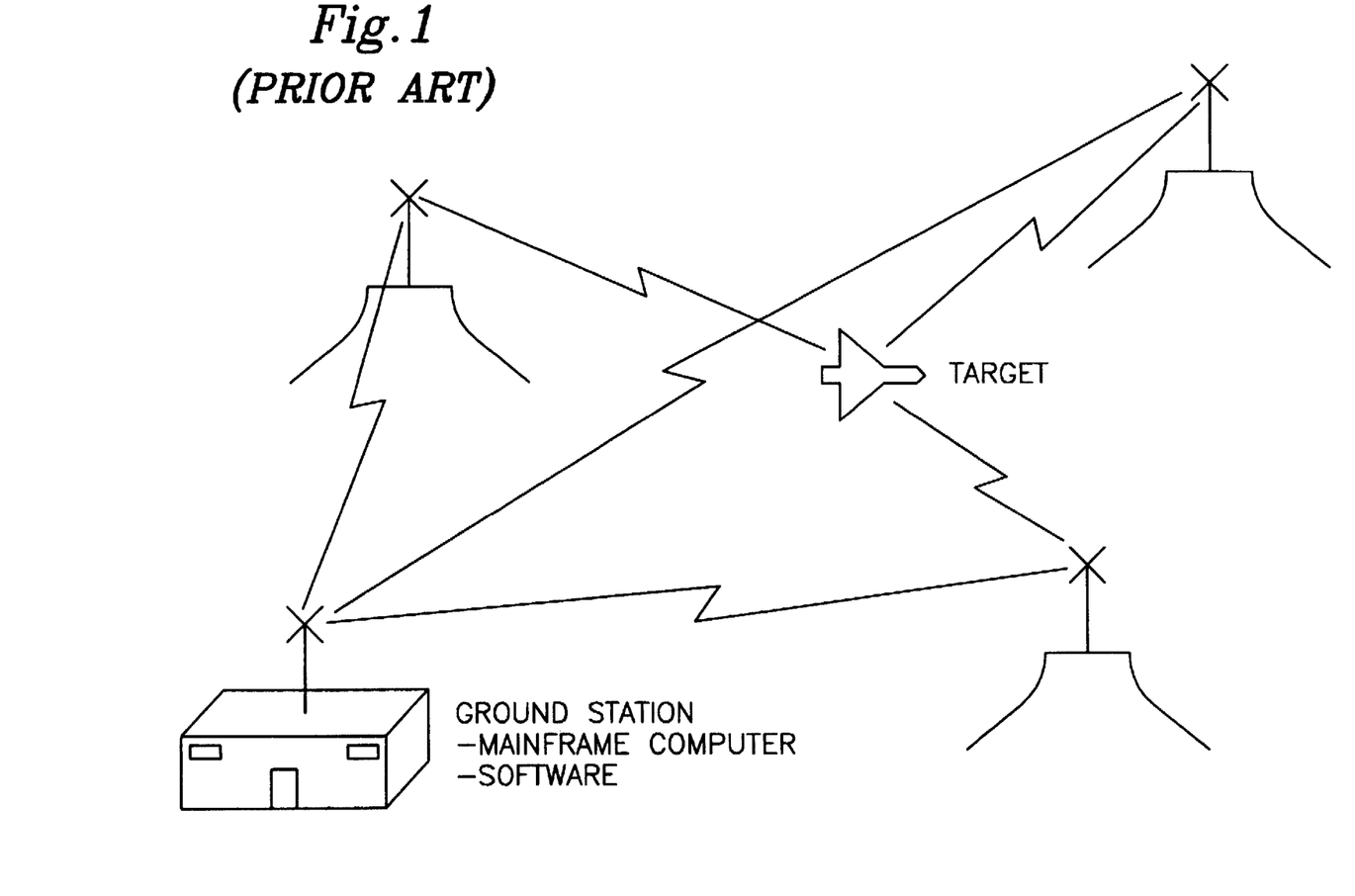
FIG. 1 is a diagram of a prior art drone control system.

In a second type of drone ground station (Type 2), a series of antennas are positioned on remote sites at surveyed positions. All antenna locations must be chosen so that a maximum direct line-of-sight can be maintained with the drone. As the drone is flown, it must remain in line-of-sight contact with at least three antennas so that the drone's position can be determined using triangulation techniques. Uplink commands and downlink telemetry data is also provided using the RF link between the ground station antennas and the drone. This type of ground station can be seen in FIG. 1.

In the third type of ground station (Type 3), an onboard position estimator (e.g., global positioning system (GPS)) is used to determine drone position, and the position data is downlinked to the ground station that can be either Type 1 or Type 2.

The above types of drone ground stations have several drawbacks. One drawback is that the Type 1 system is very limited by the landscape in which the drone is operated. Care must be taken so the drone does not fly into areas in which line-of-sight is lost with the single ground station antenna. Therefore, flight low to the ground or behind terrain is not possible in this type of ground station. The Type 2 ground station is capable of improving upon the Type 1 ground station, as long as enough antennas can be properly positioned around the area in which the drone will be flown. However, in many areas, especially in ocean areas, this is impractical. In addition, the Type 2 ground station is typically very costly due to the need for many antennas and also because this type of ground station typically requires fast and complex computations within the ground station, therefore requiring expensive software and hardware. The Type 3 ground station has the advantage of on-board position determination, but is still dependent on line-of-sight being maintained between the drone and the ground station. Another significant drawback of all of these ground stations is that they are incapable of providing complex drone maneuvers that an on-board pilot could perform.

These limitations have been especially noticeable with target drones. A typical drone training mission consists of the target drone flying in a straight line at a constant velocity. Some prior art drones have been preprogrammed with particular maneuvers but these are limited and do not accurately mimic a manned aircraft in a battle situation. None of the prior art drone systems provide a realistic training scenario in light of the fact that modern day helicopters or fighter aircraft are highly maneuverable and able to fly at any speed at very low altitudes. Modern day helicopters or fighters also can perform a number of evasive maneuvers in order to avoid a ground attack. The possibility of incorporating complex maneuvers and low-altitude flight into a target drone mission would be of great advantage in training ground troops and testing anti-aircraft systems.

Therefore, it is an object of the present invention to provide a drone control system which enables the vehicle to a perform complex maneuvers automatically with or without the vehicle being in contact with a ground station.

Other objects, features and advantages of the invention will become apparent to those skilled in the art from the description of the preferred embodiment, claims and drawings hereof, wherein like numerals refer to like elements.

SUMMARY OF THE INVENTION

Disclosed herein is a learning autopilot which provides automatic control for a vehicle. The autopilot apparatus includes a position estimation system which provides position information for the vehicle within a known reference frame. A memory contains position information for the vehicle which was stored during a piloted rehearsal mission. The position information was acquired by periodically sampling signals output by the position estimation system. During automatic operation of the vehicle when the learning autopilot is engaged, the position information stored in the memory is compared to actual position information received from the position estimation system and a plurality of error signals is generated. The error signals are proportional to the difference between the stored and actual position information. A control system in the vehicle converts the error signals to control signals which provide directional and velocity control for the vehicle.

The first step in using the learning autopilot is manually piloting the vehicle through a rehearsal mission. During this rehearsal flight, position information is generated for the vehicle and stored in a memory at predetermined or adaptive intervals. During automatic operation of the vehicle, the position information stored in memory is retrieved and compared to actual position information for the vehicle generated by the position estimation system. A comparison is made between the actual and recorded position information and error signals are generated which are proportional to the difference between the actual and recorded position information. The error signals are converted to control signals for operation of the vehicle. The recorded position information allows for automatic operation of the vehicle through a predetermined mission without the direct control of a ground station.

DESCRIPTION OF THE PREFERRED EMBODIMENT(S)

Figure 2:
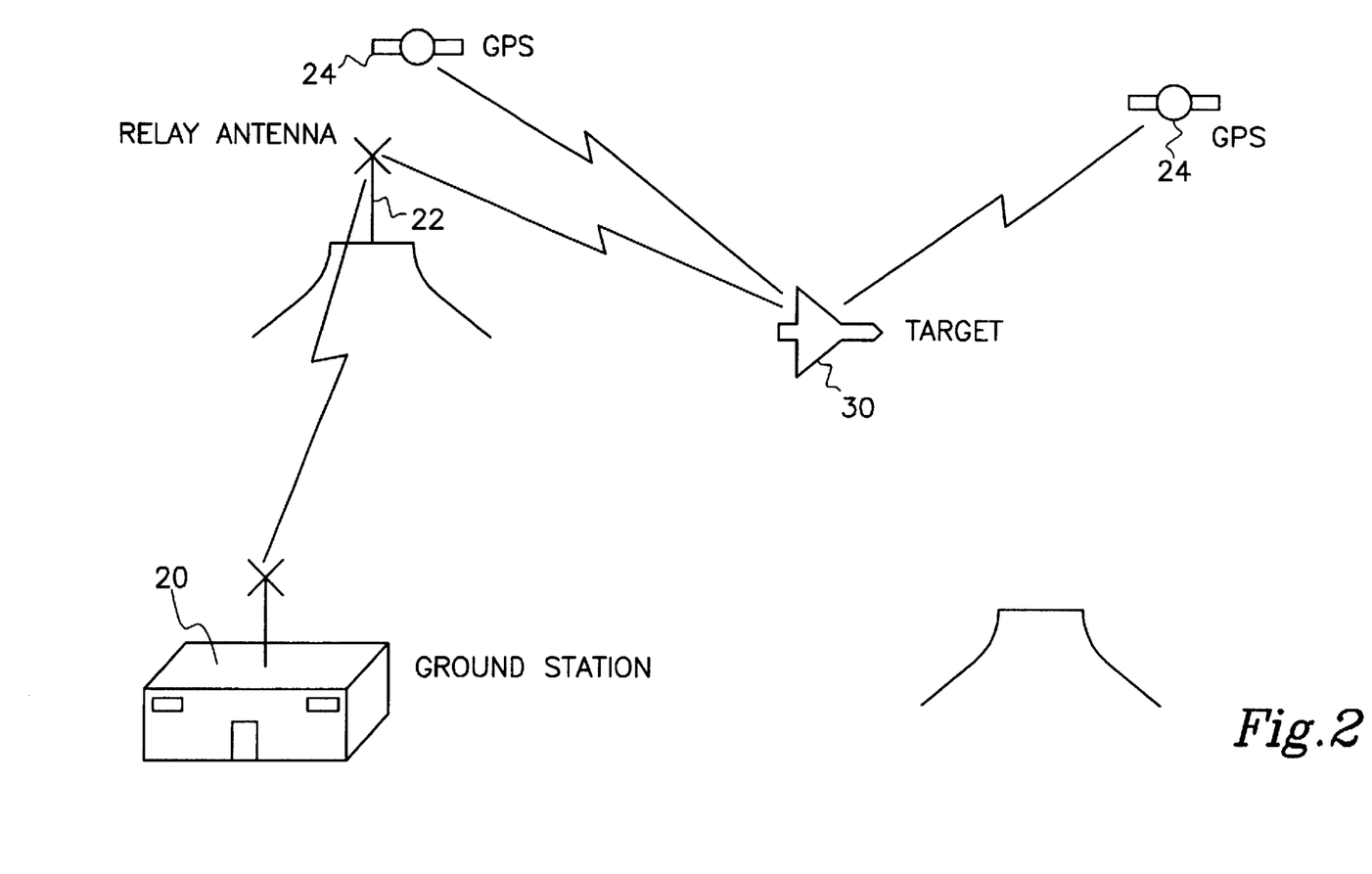
FIG. 2 is a diagram of an embodiment of the learning autopilot system.

Shown in FIG. 2 is a diagram of the basic components of the learning autopilot system described herein. Included in the system is target 30, which in this case is shown as an aircraft, either a helicopter or an airplane. In the preferred embodiment of the invention, the learning autopilot will be described in relation to an aircraft, however, it is within the scope of this invention to include other vehicles, such as ground vehicles or boats. In the present embodiment, the aircraft is a drone which can either be flown manually or remotely through ground station 20. Ground station 20 includes appropriate hardware and software so that control signals can be sent to the drone aircraft. Ground station 20 is also equipped to receive downlink telemetry while the aircraft is in operation. Also included on the aircraft 30 is a position estimation system, such as a global positioning system (GPS) unit, which receives and translates positional information transmitted from GPS satellites 24. Through use of GPS, the aircraft system and ground station are able to monitor location of the aircraft 30.

The learning autopilot disclosed herein provides for automatic operation of the drone aircraft even when it is out of contact with the ground station. In order to provide more realistic maneuvers for ground forces, or to test anti-aircraft guns or missiles, it is desirable to have a drone aircraft which can perform complex maneuvers, or fly at low altitude and is not limited by the landscape of the area in which the exercises are being performed. A drawback of modern day drone control systems is that the drone must always stay in contact with the ground station, either through a direct line of sight link, or through relay antennas strategically placed in and around (or above) the exercise area. With the learning autopilot incorporated into the drone aircraft, automatic commands are stored in a memory and complex maneuvers are performed without direct contact with the ground station.

The first step in providing automatic control for the drone aircraft is creating a memory which contains position information for performing the desired maneuvers. In the preferred embodiment of the invention, the drone aircraft 30 is provided with an electronic nonvolatile memory. Stored in the memory is four-dimensional (4-D) location and time data for the aircraft within a known reference frame. In the preferred embodiment of the invention, the four dimensions are longitude, latitude, altitude, and time. If it is so desired, time can be replaced with velocity.

Figure 3:
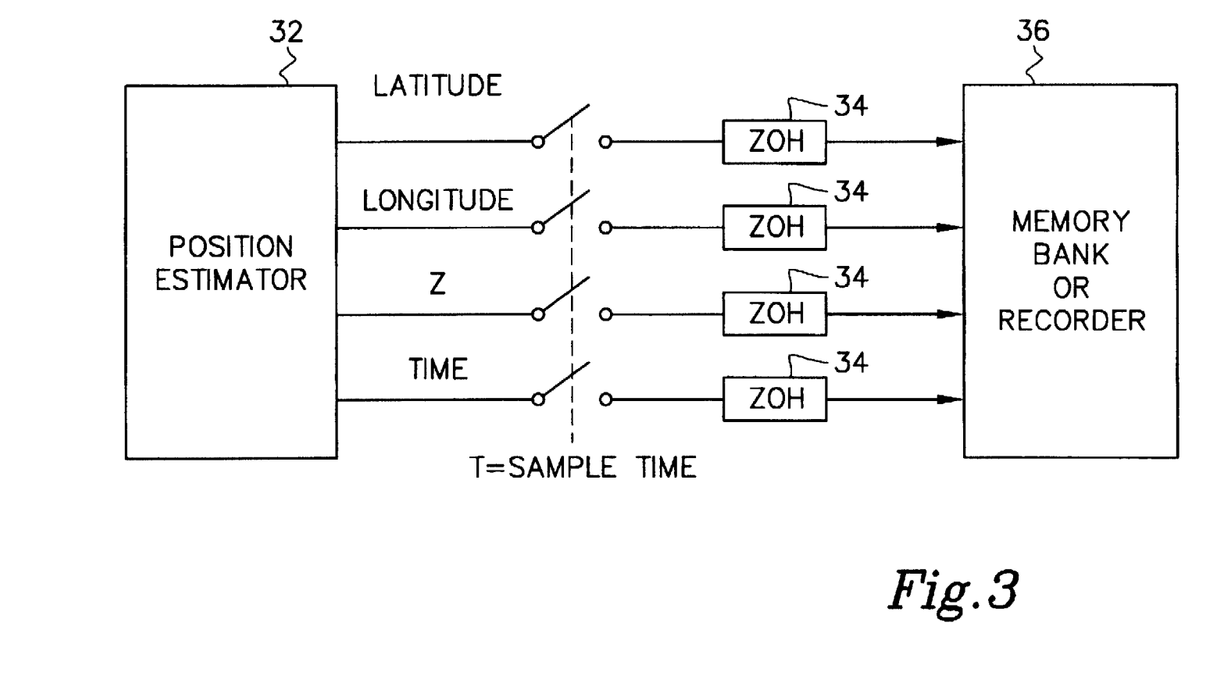
FIG. 3 shows the transfer of information between the position estimator and the memory during the manned rehearsal flight.

The system for generating the 4-D data for the drone aircraft is shown in detail in FIG. 3. The 4-D data for the drone aircraft is established with the position estimator. In the preferred embodiment of the invention, as shown in FIG. 2, GPS is used for this purpose. Although GPS is used in the preferred embodiment, it is conceivable that other systems, such as inertial guidance, Doppler radar, or other position estimators, may be employed to generate 4-D data for the aircraft. The position estimator is connected to memory bank 36 through a series of switches and sampling devices such as the zero order hold (ZOH) devices 34. The switches are closed at a predetermined or adaptive sampling rate in order to fully reconstruct the mission. The ZOH devices 34 maintain the value of the incoming signals after the switches have been opened. In one embodiment, the 4-D data is stored in a non-volatile memory onboard the aircraft. In another embodiment of the invention, the 4-D data is downloaded to the ground station which records the 4-D data in real time.

In order to create the desired mission in memory, a pilot will take the drone aircraft on a rehearsal flight. As needed, the pilot will take the craft through a series of preplanned maneuvers. During these maneuvers, the 4-D signals from the position estimator signals are sampled at a predetermined or adaptive rate and the signals are stored in memory 36. An adaptive rate means that the sampling rate can be changed depending on the complexity of the maneuver (i.e., more sampling would be needed for a turn and roll maneuver than simply flying in a straight line). Once the rehearsal mission is complete, the 4-D data stored in memory can be used in a drone aircraft.

Figure 4:
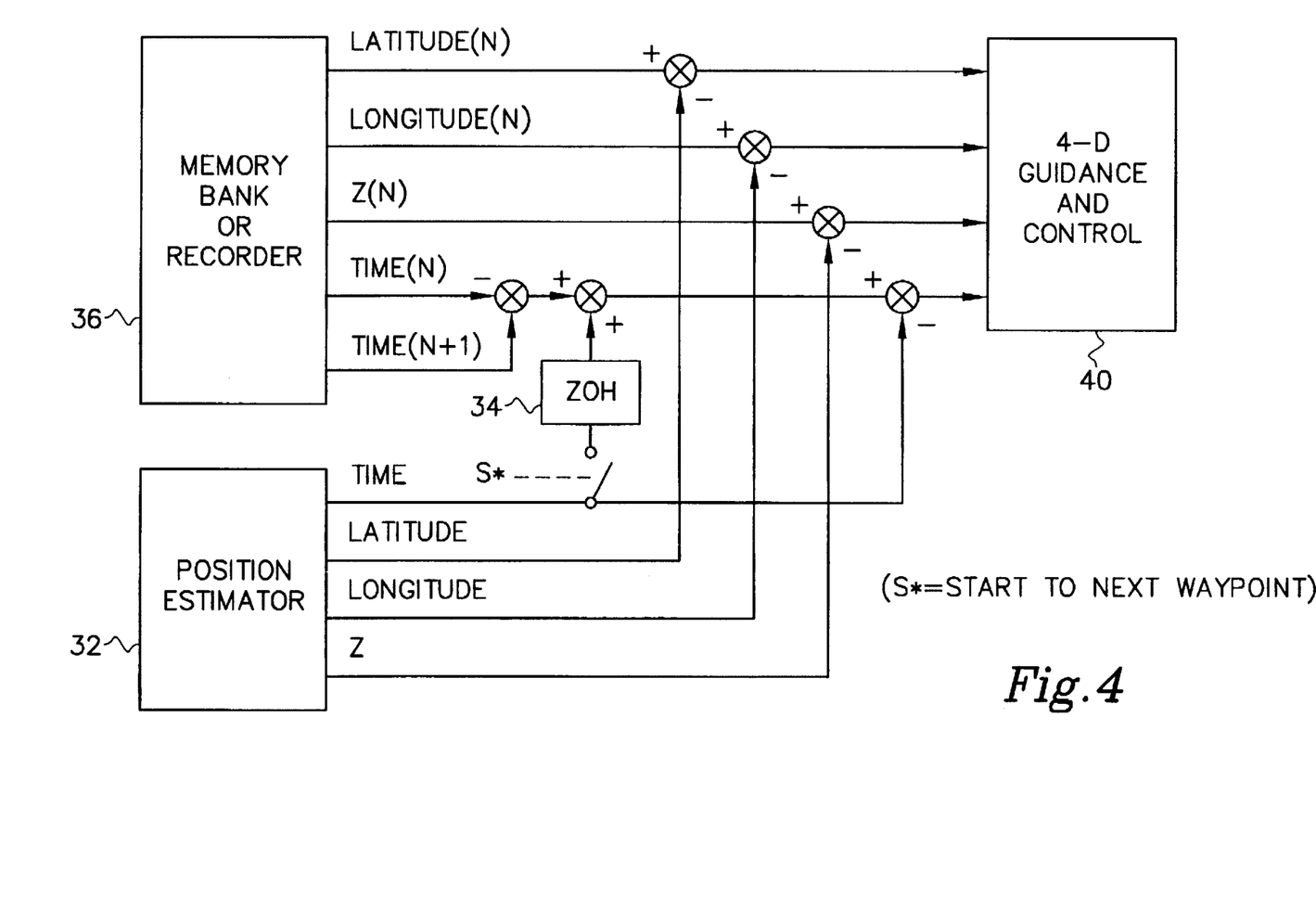
FIG. 4 shows the generation of the error signals for directional and velocity control during the automatic flight.

The system configuration for the drone aircraft is shown in FIG. 4. Included in the system is the position estimator 32, memory 36, and 4-D guidance and control 40. The position estimator 32 is the same unit described above for the rehearsal mission. An exemplary 4-D control system that can be used with the present invention—although other examples exist—is found in Gonser et al., U.S. Pat. No. 5,408,413, Apparatus and Method for Controlling an Optimizing Aircraft Performance Calculator to Achieve a Time-constrained Navigation, issued Apr. 18, 1995. The position estimator 32 also outputs 4-D data for the drone aircraft during its unmanned missions. The memory 36, as described above, contains 4-D data for the aircraft generated during the rehearsal mission. The 4-D data for the automatic maneuvers to be performed are associated with particular mission waypoints. The position estimator 32 outputs actual 4-D data for the drone aircraft which is subtracted from the 4-D data output from memory 36. A link is also provided between the actual time output by the position estimator and the recorded time in memory so that the two sources of 4-D information are synchronized. This synchronization is necessary because the automatic mission in most cases will not occur at the same time of day as the rehearsal mission was recorded. If desired, the position data can also be synchronized to the initial position of the automatic maneuver, such that the difference between each incremental waypoint during automatic flight is added to the current position. This provides for performing a particular sequence of maneuvers at locations other than where they were performed. The error signals generated from the subtraction of the 4-D signals are then fed into the 4-D guidance and control computer 40, which has software commonly known in the industry, which converts the magnitude of the error signals into control signals which provide direction, attitude, and speed control for the drone aircraft.

During a drone mission in which the learning autopilot is employed, the drone is first remotely piloted to the first preprogrammed mission waypoint which was established during the rehearsal mission. Once the waypoint is reached, the automatic guidance is engaged and automatic flight begins. While in the automatic mode, the memory 36 outputs 4-D (waypoint) information which is 1 time increment ahead of the previous 4-D (waypoint) information output by the memory bank 36. The difference between the current waypoint and the current output of the position estimator 32, will always exist between the two signals, which acts to lead the drone aircraft through the desired maneuvers. The magnitudes of the error signals are proportional to the difference between the monitored location of the aircraft and the desired location. As was described above, these error signals are then converted into control commands for the drone aircraft. From the continual comparisons made between the stored 4-D (waypoint) information and the actual 4-D information, the drone aircraft is able to complete the programmed maneuvers almost exactly as they were performed during the rehearsal mission. After the maneuvers are complete, the drone aircraft will reach a preprogrammed waypoint at which ground control will be reestablished and the drone aircraft will be flown back to its starting point.

Figure 5:
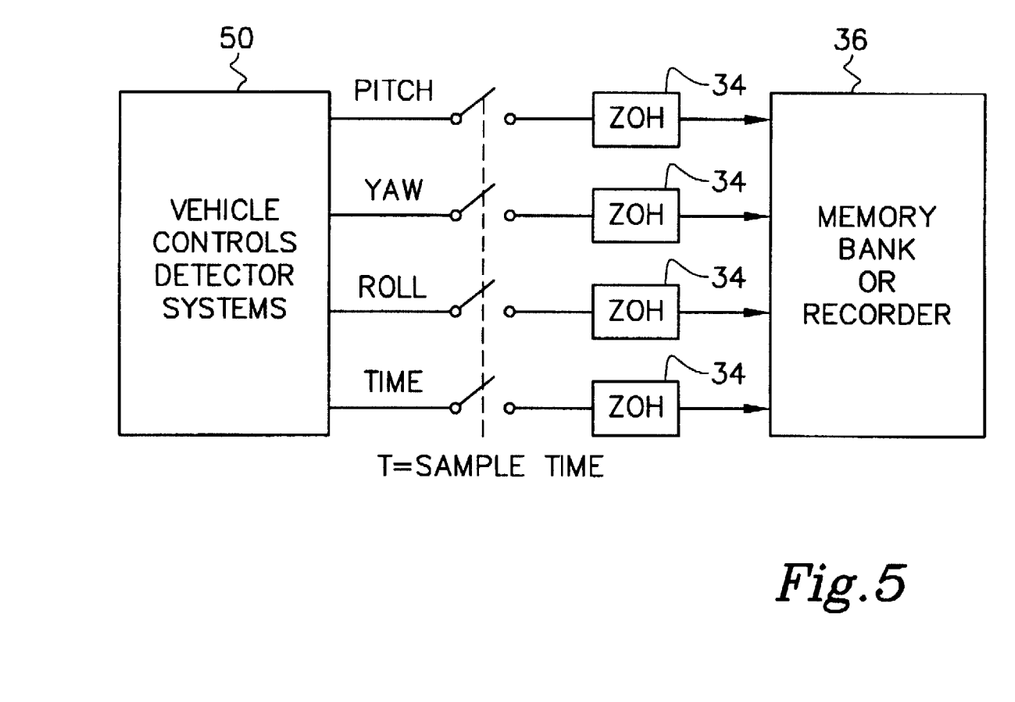
FIG. 5 shows the transfer of information between the vehicle controls detector and the memory during the manned rehearsal flight.
Figure 6:
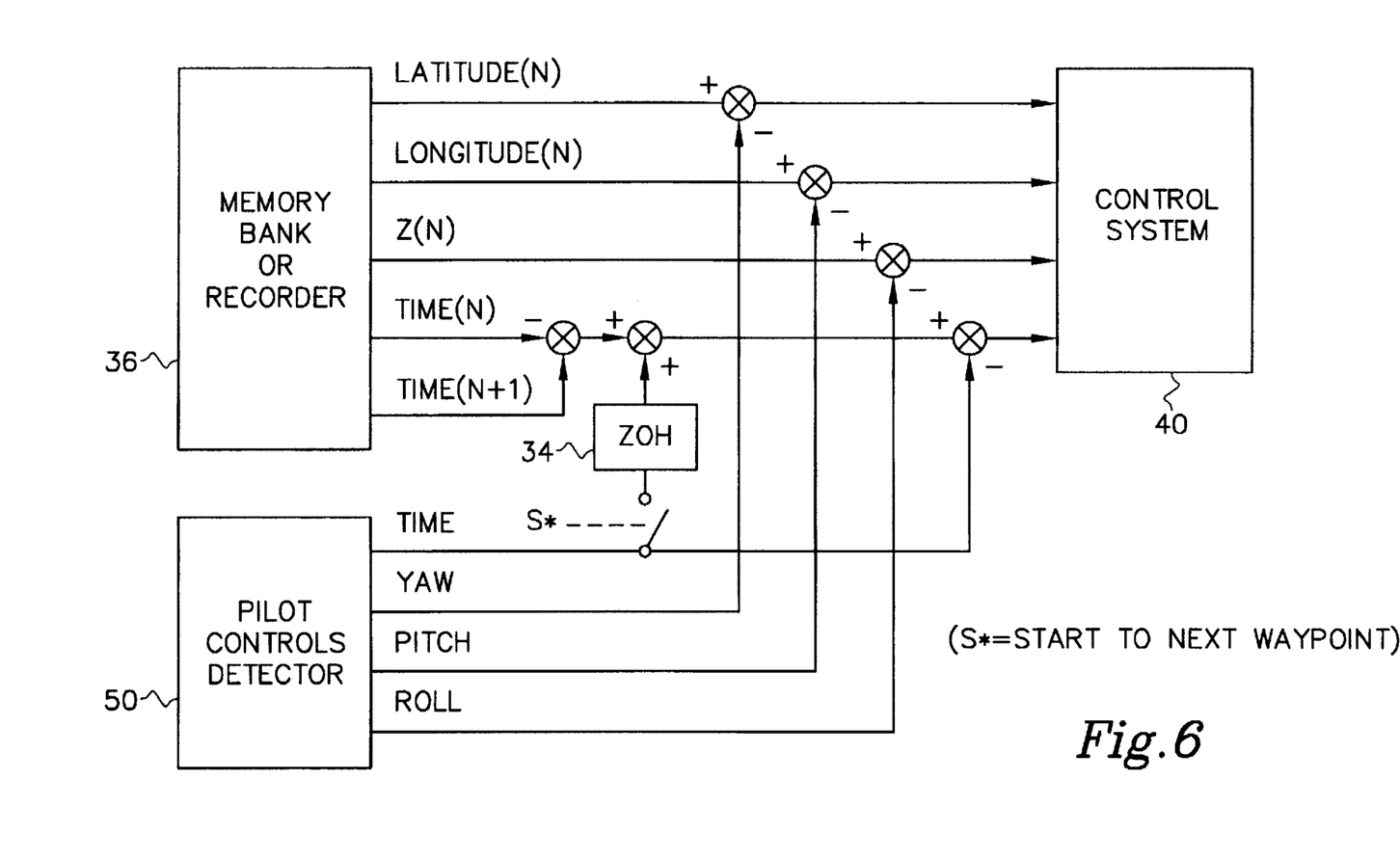
FIG. 6 shows the generation of the error signals for flight control during automatic flight.

An alternate embodiment of the invention is shown in FIGS. 5 and 6. In this embodiment, the 4-D (waypoint) information which was previously gathered through GPS or other means, is replaced by a system in which pilot movements of the aircraft control mechanisms are monitored over time. Using the system shown in FIG. 5, the vehicle control detector system 50 detects the pilot's movement of the control stick during a rehearsal mission and these movements are recorded in memory 36 in relation to the mission time. As shown in FIG. 5 these movements are associated with pitch, roll, yaw, and throttle control movements of the aircraft.

The drone control system for the drone aircraft is shown in FIG. 6. In this system, the signals output from memory 36 are compared to the actual movements of the control mechanisms to generate a series of error signals which are transmitted to the control system 40. Once again, means are provided to synchronize the recorded movement times and actual time. The control system 40 converts the error signals to control signals for the aircraft.

During the automatic operation, the drone aircraft is flown to a predetermined waypoint where the autopilot is then engaged. The stored pilot movement information is then output and the preprogrammed maneuvers are begun. As in the preferred embodiment, the recorded pilot control movement information is output 1 time increment ahead of the previous output of the memory bank 36. The difference between the current pilot control reference and the actual position of the aircraft controls, acts to lead the drone aircraft through the maneuver. Once the desired maneuvers are complete, ground control is reestablished and the drone aircraft is returned.

In the embodiments described above, the recorded flight information becomes a permanent record and can be used indefinitely. The recorded flight data does not necessarily have to be used with the aircraft used in the rehearsal flight. This information recorded in memory can be used in other aircraft which have similar size and performance. If one particular rehearsed mission is found to be particularly effective, it can be stored over time and can be used over and over again in a limited variety of aircraft.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

The embodiments of the invention in which an exclusive property or right is claimed are defined as follows:

1. An apparatus for providing automatic control of a vehicle comprising:

means for providing vehicle position information, the vehicle position information comprising time information for the vehicle within a known reference frame, the reference frame having at least three dimensions;

a memory means which stores position information at predetermined intervals while the vehicle is operated during a rehearsal mission in the known reference frame;

means for comparing the stored vehicle position information with actual position information from said means for providing vehicle position information during automatic operation of the vehicle and generating a plurality of error signals, each of the error signals has a magnitude proportional to the difference between the stored vehicle position information and actual vehicle position information; and vehicle control means which receives the plurality of error signals from said means for comparing and converts the error signals to control signals which control the movements of the vehicle, where the vehicle moves according to the vehicle position information stored in the memory means.

2. The apparatus for providing automatic control of a vehicle of claim 1 wherein the vehicle is an aircraft.

3. The apparatus for providing automatic control of a vehicle of claim 1 wherein the vehicle position information is 4 dimensional (4-D) information of longitude, latitude, altitude, and time for the vehicle within the known reference frame.

4. The apparatus for providing automatic control of a vehicle of claim 3 wherein the time of the vehicle within the known reference frame is replaced by velocity of the vehicle within the known reference frame.

5. The apparatus for providing automatic control of a vehicle of claim 3 wherein the 4-D position information is generated by a global positioning system (GPS) mounted on the vehicle.

6. The apparatus for providing automatic control of a vehicle of claim 3 wherein the 4-D position information is generated by an inertial sensor system mounted on the vehicle.

7. The apparatus for providing automatic control of a vehicle of claim 3 wherein the 4-D position information is generated by a Doppler radar system.

8. The apparatus for providing automatic control of a vehicle of claim 1 wherein the vehicle position information is comprised of measuring operator movement of control surfaces of the vehicle.

9. The apparatus for providing automatic control of a vehicle of claim 1 wherein the memory means is a nonvolatile memory.

10. The apparatus for providing automatic control of a vehicle of claim 9 wherein the vehicle position information is downlinked to a ground station for storage in real time.

11. The apparatus for providing automatic control of a vehicle of claim 2 wherein the vehicle is a helicopter.

12. A method of providing automatic control of a vehicle comprising the steps of:

providing means to generate position information for the vehicle during operation, the position information comprising time information for the vehicle in a known reference frames, the reference frame having at least three dimensions;

manually operating the vehicle in the known reference frame according to a predetermined plan;

recording the position information for the vehicle in a memory at predetermined intervals;

during automatic operation of the vehicle in the known reference frame, generating a plurality error signals which are proportional to the difference between the recorded position information and actual position information for the vehicle; and converting said error signals into control signals which provide for automatic operation of the vehicle.

13. The method of providing automatic control of a vehicle of claim 12 wherein the vehicle is an aircraft.

14. The method of providing automatic control of a vehicle of claim 13 wherein the vehicle is a helicopter.

15. The method of providing automatic control of a vehicle of claim 12 wherein the vehicle is a land vehicle.

16. The method of providing automatic control of a vehicle of claim 12 wherein the vehicle is a water-going vessel.

17. The method of providing automatic control of a vehicle of claim 12 wherein the vehicle position information is 4-dimensional (4-D) information comprised of longitude, latitude, altitude, and time for the vehicle within the known reference frame.

18. The method of providing automatic control of a vehicle of claim 17 wherein velocity is included in the 4-D position.

19. The method of providing automatic control of a vehicle of claim 12 wherein the vehicle position information is measured movements of the vehicle controls by the pilot at the predetermined intervals.

20. The method of providing automatic control of a vehicle of claim 12 wherein the predetermined interval is adaptive depending on the type of maneuver the vehicle is making.

21. The method of providing automatic control of a vehicle of claim 17 wherein maneuvers performed during the automatic operation of the vehicle are performed at a different absolute time from maneuvers in the recorded data, with elapsed time of the recorded maneuvers remaining the same.

22. The method of providing automatic control of a vehicle of claim 12 wherein maneuvers performed during the automatic operation of the vehicle from the recorded position information are translated to a different position within the known reference frame.

* * * * *

(12) EX PARTE REEXAMINATION CERTIFICATE (8465th)
United States Patent
Peter et al.

(10) Number: US 5,785,281 C1
(45) Certificate Issued: Aug. 16, 2011

(54) LEARNING AUTOPILOT (75) Inventors: Francis E. Peter, Albuquerque, NM (US); Fred M. Strohacker, Albuquerque, NM (US)

(73) Assignee: Honeywell Inc., Minneapolis, MN (US)

Reexamination Request:
No. 90/011,049, Jun. 15, 2010

Reexamination Certificate for:
Patent No.: 5,785,281
Issued: Jul. 28, 1998
Appl. No.: 08/333,162
Filed: Nov. 1, 1994

(51) Int. Cl.
*B64C 13/16* (2006.01)

(52) U.S. Cl. .................. 244/190; 244/3.17; 342/64; 701/223

(58) Field of Classification Search .................. None
See application file for complete search history.

(56) References Cited

U.S. PATENT DOCUMENTS

| 3,688,252 A | 8/1972 | Thompson |
| 4,764,883 A | 8/1988 | Nakagawa |
| 4,868,755 A | 9/1989 | McNulty |
| 5,051,910 A | 9/1991 | Liden |
| 5,193,064 A | 3/1993 | Maki |
| 5,408,413 A | 4/1995 | Gonser |

OTHER PUBLICATIONS

Furuno Operator's Manual for FAP-55 autopilot, published 1992.
"The NAVSTAR Global Positioning System", Logsdon, T., published 1992; Van Nostrand Reinhold, Copyright 1992, pp. 14, 16, 42 and 210-222.

*Primary Examiner* — William Doerrler (57) ABSTRACT

A learning autopilot for a vehicle provides the capability to command complex maneuvers or maneuver the vehicle when control by its ground station is not possible. A memory is used during a piloted rehearsal mission and position and time information for the aircraft is stored in the memory. This memory is incorporated into the vehicle control system, and during automatic operation of the aircraft, the recorded position and relative time information is retrieved and compared against position and relative time information occurring during automatic flight. The difference between the recorded information and the actual flight information is used to generate error signals which are converted to command signals for the vehicle. Maneuvers which were initiated and completed by the pilot during the rehearsal mission are then repeated during the automatic flight from the flight information stored in the memory.

US 5,785,281 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-22 is confirmed.

New claims 23-55 are added and determined to be patentable.

*23. The apparatus for providing automatic control of a vehicle of claim 9 wherein the means for providing vehicle position information comprises at least a global positioning system mounted on the vehicle.*

*24. The apparatus for providing automatic control of a vehicle of claim 23 wherein the vehicle is a water-going vessel.*

*25. The apparatus for providing automatic control of a vehicle of claim 1 wherein the means for providing vehicle position information comprises at least a global positioning system mounted on the vehicle.*

*26. The apparatus for providing automatic control of a vehicle of claim 25 wherein the vehicle is a water-going vessel.*

*27. The apparatus for providing automatic control of a vehicle of claim 26 wherein the at least three dimensions comprises longitude, latitude, and time.*

*28. The apparatus for providing automatic control of a vehicle of claim 26 wherein the at least three dimensions comprises longitude, latitude, and velocity.*

*29. The apparatus for providing automatic control of a vehicle of claim 26 wherein the stored vehicle position comprises waypoints.*

*30. The apparatus for providing automatic control of a vehicle of claim 25 wherein the control signals provide directional control of the vehicle.*

*31. The apparatus for providing automatic control of a vehicle of claim 25 wherein the control signals provide attitude control of the vehicle.*

*32. The apparatus for providing automatic control of a vehicle of claim 25 wherein the control signals provide speed control of the vehicle.*

*33. The apparatus for providing automatic control of a vehicle of claim 1 wherein the means for providing vehicle position information comprises at least an inertial guidance system mounted on the vehicle.*

*34. The apparatus for providing automatic control of a vehicle of claim 23 wherein the predetermined interval is adaptive depending on the type of maneuver the vehicle is making.*

*35. The apparatus for providing automatic control of a vehicle of claim 25 wherein the predetermined interval is adaptive depending on the type of maneuver the vehicle is making.*

*36. The method of providing automatic control of a vehicle of claim 12 wherein the means for providing vehicle position information comprises at least a global positioning system mounted on the vehicle.*

*37. The method of providing automatic control of a vehicle of claim 36 wherein the vehicle is a water-going vessel.*

*38. The method of providing automatic control of a vehicle of claim 36 wherein the at least three dimensions comprises longitude, latitude, and time.*

*39. The method of providing automatic control of a vehicle of claim 36 wherein the at least three dimensions comprises longitude, latitude, and velocity.*

*40. The method of providing automatic control of a vehicle of claim 36 wherein the recorded position information comprises waypoints.*

*41. The method of providing automatic control of a vehicle of claim 36 wherein the control signals provide directional control of the vehicle.*

*42. The method of providing automatic control of a vehicle of claim 36 wherein the control signals provide attitude control of the vehicle.*

*43. The method of providing automatic control of a vehicle of claim 36 wherein the control signals provide speed control of the vehicle.*

*44. The method of providing automatic control of a vehicle of claim 12 wherein the means for providing vehicle position information comprises at least an inertial guidance system mounted on the vehicle.*

*45. The method of providing automatic control of a vehicle of claim 36 wherein the predetermined interval is adaptive depending on the type of maneuver the vehicle is making.*

*46. An apparatus for providing automatic control of a water-going vehicle, comprising:*

*a global positioning system mounted on the vehicle which provides vehicle position information, the vehicle position information comprising time information for the vehicle within a known reference frame, the reference frame having at least three dimensions;*

*an electronic nonvolatile memory which stores position information at adaptive intervals depending on the complexity of the maneuver while the vehicle is operated during rehearsal mission in the known reference frame;*

*an autopilot for comparing the stored vehicle position information with actual position information from the global positioning system during automatic operation of the vehicle and generating a plurality of error signals, each of the error signals having a magnitude proportional to the difference between the stored vehicle position information and actual vehicle position information; and* a vehicle control system which receives the plurality of error signals and converts the error signals to control signals which control the directional movements of the vehicle, where the vehicle moves according to the vehicle position information stored in the electronic nonvolatile memory.

47. An apparatus for providing automatic control of a water-going vehicle comprising:

a global positioning system mounted on the vehicle which provides time information and vehicle spatial information within a known reference frame having at least three dimensions;

an electronic nonvolatile memory which stores the vehicle spatial information at adaptive intervals while the vehicle is operated during a rehearsal mission in the known reference frame;

an autopilot for comparing the stored vehicle spatial information with actual vehicle spatial information from the global positioning system during automatic operation of the vehicle in the known reference frame, wherein the autopilot generates a plurality of error signals having a magnitude proportional to the difference between the stored vehicle spatial information and actual vehicle spatial information; and a control system which receives the plurality of error signals and controls the directional movements of the vehicle based on the error signals.

48. An apparatus for providing automatic control of a vehicle comprising:

a global positioning system mounted on the vehicle, wherein said global positioning system is configured to provide vehicle latitude, longitude, and time information within a reference frame having at least three dimensions;

an electronic memory, wherein said memory is capable of storing a position of said vehicle at predetermined intervals while the vehicle is operated during a rehearsal mission in said reference frame;

an autopilot for comparing the stored vehicle position information with actual position information from said global positioning system during automatic operation of said vehicle, wherein said autopilot is capable of generating a plurality of error signals having a magnitude proportional to the difference between said stored vehicle position information and actual vehicle position information; and a control system, wherein said control system is capable of receiving said error signals from said autopilot and controlling movements of said vehicle based on the error signals.

49. A method for providing automatic control of a vehicle comprising the steps of:

receiving a first set of position information for the vehicle during manual operation of the vehicle according to a predetermined plan, wherein said position information is with respect to a reference frame having at least three dimensions;

receiving time information for said vehicle with respect to one of said dimensions of said reference frame;

recording said received first set of position information for said vehicle in a memory at predetermined intervals;

receiving a second set of position information for said vehicle during automatic operation of said vehicle in said known reference frame;

generating error signals related to a difference between said recorded first set of position information and said second set of position information; and converting said error signals into control signals which provide for automatic operation of the vehicle.

50. The method of claim 49 wherein said vehicle is a boat.

51. The method of claim 49 wherein said vehicle position information is received from a global positioning system.

52. The method of claim 49 wherein said vehicle position information comprises 4-dimensional position information.

53. The method of claim 49 wherein said vehicle position information comprises latitude and longitude.

54. An apparatus for providing automatic control of a water-going vehicle, comprising:

a global positioning system mounted on the water-going vehicle which provides vehicle position information, the vehicle position information comprising latitude, longitude, and time information for the vehicle within a known global reference frame, the reference frame having at least three dimensions;

an electronic nonvolatile memory that stores the vehicle position information at adaptive intervals depending on the complexity of the maneuver performed by the water-going vehicle as it is operated during a rehearsal mission in the known reference frame, wherein the complexity of the maneuver is based at least on the extent to which the maneuver diverges from a straight line;

an autopilot for comparing the stored vehicle position information with actual position information from the global positioning system during automatic operation of the vehicle and generating a plurality of error signals, each of the error signals having a magnitude proportional to the difference between the stored vehicle position information and actual vehicle position information; and a vehicle control system which receives the plurality of error signals and converts the error signals to control signals which control the directional movements of the vehicle, where the vehicle moves according to the vehicle position information stored in the electronic nonvolatile memory.

55. An apparatus for providing automatic control of a water-going vehicle, comprising:

a global positioning system mounted on the water-going vehicle which provides vehicle position information, the vehicle position information comprising latitude, longitude, and time information for the vehicle within a known global reference frame, the reference frame having at least three dimensions;

an electronic nonvolatile memory that stores the vehicle position information at intervals based on at least one of distance and time settings selectable by a user as the water-going vehicle is operated during a rehearsal mission in the known reference frame;

an autopilot for comparing the stored vehicle position information with actual position information from the global positioning system during automatic operation of the vehicle and generating a plurality of error signals, each of the error signals having a magnitude proportional to the difference between the stored vehicle position information and actual vehicle position information; and a vehicle control system which receives the plurality of error signals and converts the error signals to control signals which control the directional movements of the vehicle, where the vehicle moves according to the vehicle position information stored in the electronic nonvolatile memory.

* * * * *